United States Patent Office 2,983,962
Patented May 16, 1961

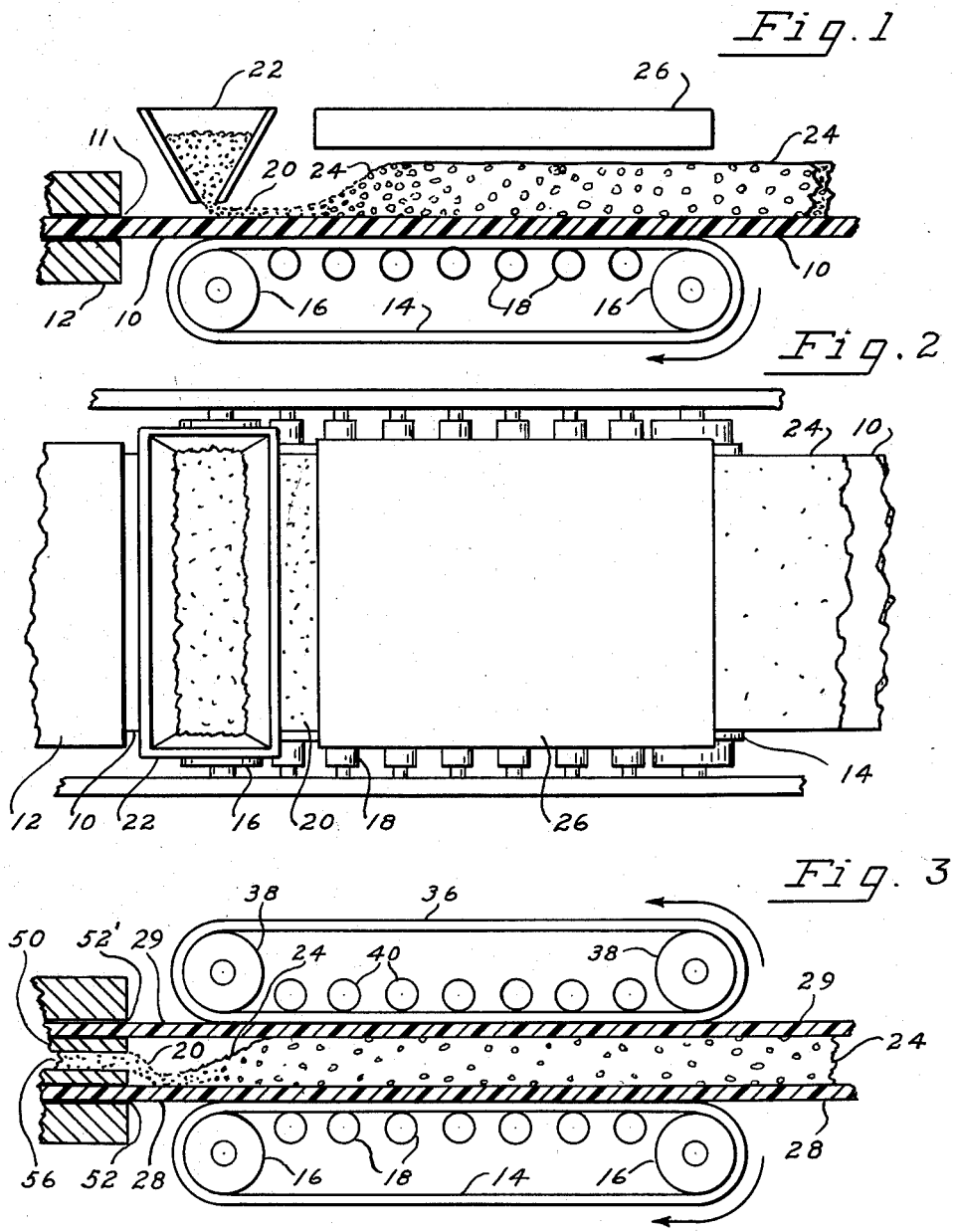

2,983,962
METHOD FOR PREPARING LAMINATED RESIN FOAM STRUCTURES

Edmund H. Merz, Wilbraham, and Raymond A. Barkhuff, Jr., Springfield, Mass., assignors to Monsanto Chemical Company, St. Louis, Mo., a corporation of Delaware Filed Mar. 15, 1960, Ser. No. 15,098
5 Claims. (Cl. 18—59)

The present invention relates to improved methods for preparing laminated resin foam structures and more particularly to methods for preparing resin foam sheets that are laminated to a thermoplastic resin sheet.

Resin foams such as foamed polystyrene, foamed polyvinyl chloride, etc., are low density materials having high strength/weight ratios and excellent thermal and electrical insulating properties. Laminated resin foam structures comprising a resin foam having one or a plurality of thermoplastic resin sheets laminated thereto are highly useful in the fabrication of refrigerator panels, lightweight shipping containers, display racks, novelties, etc. The methods heretofore employed for preparing such laminated resin foam structures have been relatively inefficient. In general, the resin foam is cut to the desired shape from a large block or cylinder of resin foam and the thermoplastic resin sheets are applied to the cut resin foam with liquid adhesives such as glue. To reduce costs and broaden the market for such laminated resin foam structures it would be desirable to have more efficient manufacturing processes and particularly to have continuous manufacturing processes for preparing such laminated structures directly from beads or granules of a foamable resin composition.

Accordingly, it is an object of this invention to provide improved methods for preparing laminated resin foam structures.

Another object of this invention is to provide continuous methods for preparing laminated resin foam structures.

Other objects and advantages of this invention will become apparent from the following detailed description thereof when read in conjunction with the accompanying drawings in which Fig. 1 is a side elevation view partially in section of one embodiment of the invention in which a resin foam is laminated to a sheet of thermoplastic resin, Fig. 2 is a top plan view of the embodiment illustrated in Fig. 1, and Fig. 3 is a side elevation view partially in section of an embodiment of the invention in which a sandwich structure is provided by laminating thermoplastic sheets to both sides of a sheet of resin foam.

An efficient method for preparing laminated resin foam structures has been discovered. In this method, a particulate foamable resin composition is deposited on a hot sheet of thermoplastic resin and the sensible heat of the thermoplastic resin sheet foams the resin. If desired, the laminated structure may thereafter be heated with heat from a second source to further foam the foamable resin and lower the density thereof.

In the embodiment of the invention illustrated in Figs. 1 and 2, a sheet of thermoplastic resin 10, e.g., polystyrene, is extruded from an orifice 11 of sheet forming die 12 onto an endless belt 14 which is driven by drive rolls 16 and supported by load-carrying rolls 18. Beads of foamable resin 20, e.g., polystyrene containing 5–8% pentane, are metered onto sheet 10 from a hopper 22. The sensible heat of thermoplastic sheet 10, which may be extruded at temperatures of the order of 225° C., expands foamable resin beads 20 into a mass of resin foam 24. A bank of infrared heaters 26 is provided to supplement the sensible heat of sheet 10 in foaming the resin beads.

Fig. 3 illustrates an embodiment of the invention in which a sandwich structure is prepared by laminating thermoplastic sheets to both sides of a sheet of resin foam. Thermoplastic sheets 28 and 29 are extruded from orifices 52 and 52' of a double-sheet forming die 50. Foamable resin beads 20, e.g., polystyrene containing 5–8% pentane, are blown into the cavity formed between sheets 28 and 29 through a central channel 56 provided in sheet-forming die 50. The sensible heat of sheets 28 and 29 foams resin beads 20 into a mass of resin foam 24. Endless belts 14 and 36 are provided to limit the expansion of resin foam 24 and provide a sandwich structure of accurately dimensioned thickness. Belts 14 and 36 may be heated by conventional means where supplementary heat is required to foam the foamable resin beads 20.

In Figs. 1, 2 and 3, each of the endless belts is provided with elevated side guides (not shown) which prevent the foamable resin beads from being thrown off the moving sheet of thermoplastic resin. In Fig. 3, these side guides also seal the locus of the foaming so that slight pressure may be built up by the foaming resin.

Essentially any particulate foamable thermoplastic resin composition can be employed in the process of this invention. Such foamable resin compositions consist of a predominant proportion of resin and a small proportion of a foaming or blowing agent. In many cases such beads or granules will be partially foamed before they are employed in the present process.

Examples of resins that may be employed include thermoplastic resins such as the cellulose ethers and esters, e.g., ethyl cellulose, cellulose acetate, cellulose nitrate, cellulose butyrate; homopolymers and interpolymers derived from monomers containing the vinylidene group $CH_2=C<$ such as vinyl halides, e.g., vinyl chloride, vinyl bromide; vinylidene chloride; olefins, e.g., ethylene, isobutylene; vinyl esters of carboxylic acids, e.g., vinyl acetate, vinyl propionate, vinyl benzoate; vinyl ethers, e.g., vinyl methyl ether, vinyl isobutyl ether; unsaturated monocarboxylic acids and derivatives thereof, e.g., acrylic acid, methacrylic acid, acrylic acid esters, methacrylic acid esters, acrylamide, acrylonitrile; vinylidene aromatic hydrocarbons, e.g., styrene, vinyl toluene, p-ethylstyrene, 2,4-dimethylstyrene, o-chlorostyrene, 2,5-dichlorostyrene, vinyl naphthalene and interpolymers of vinylidene monomers of the above type and alpha,beta-unsaturated polycarboxylic acids and derivatives thereof, e.g., maleic anhydride, diethyl maleate, dibutyl fumarate, etc. It is feasible and sometimes desirable to employ blends of two or more thermoplastic resins, such as, e.g., blends of polystyrene with rubbery diene polymers such as natural rubber, butadiene-styrene interpolymers, butadiene-acrylonitrile interpolymers and the like. High impact polystyrene prepared by polymerizing monomeric styrene in the presence of a rubbery diene polymer also may be employed advantageously.

Suitable foaming or blowing agents for the foamable resin compositions are well known in the art and the selection of the particular foaming or blowing agent to be employed will be dictated largely by the particular resin in which it is to be incorporated.

A preferred foamable resin composition for use in the present invention comprises polystyrene having incorporated therein as a foaming agent a volatile, nonreactive organic liquid which has only a slight solvent action on the polystyrene. Examples of suitable foaming agents for this system include pentane, hexane, heptane, petroleum ether, cyclopentane, cyclopentadiene, acetone, methanol, methyl acetate, ethyl acetate, methyl formate, ethyl formate, dichlorethylene, isopropyl chloride, propionaldehyde and diisopropyl ether.

Coloring agents, pigments, light and heat stabilizers, lubricants and other plastic compounding agents may be included in the foamable resin compositions. Such compounding agents also may be included in the thermoplastic resin sheets which are employed as the covering material for the resin foam.

The covering materials that are suitable for use in the invention are sheets of thermoplastic resins that can be heated to relatively high temperatures, e.g., 200° C. or higher. Suitable sheets of the thermoplastic resin may be fabricated from a wide variety of resins such as cellulose acetate, homopolymers and interpolymers of vinyl chloride, homopolymers and interpolymers of styrene and the like.

In many cases, strong adhesive bonds can be obtained between the resin foam and the thermoplastic resin sheet without the use of adhesives. For example, strong bonds usually can be obtained without adhesives when the resin foam and the thermoplastic sheet are chemically similar, e.g., when laminating foamed polystyrene to polystyrene sheets or foamed polyvinyl chloride to polyvinyl chloride sheets. Where the thermoplastic resin sheet and the resin foam are chemically dissimilar, it may be necessary to employ adhesives to obtain strong bonds between the laminated surfaces. No particular difficulty is encountered in finding suitable adhesives and the selection of the particular adhesive to be employed will be governed largely by the chemical nature of the thermoplastic resin sheet and the resin foam.

The heat required to foam the foamable resin is supplied simply by heating the thermoplastic resin sheet to a high temperature of the order of 200° C. or higher immediately prior to depositing the particulate foamable resin composition thereon. In some cases, it is desirable and/or expedient to supply the heat to foam the particulate foamable resin composition in two or more steps. In the first step, the foamable resin composition may be partially foamed and a strong adherent bond formed between the resin foam and the thermoplastic resin sheet by the method previously described. In the second and/or subsequent steps, the foamable resin composition is foamed further to provide a laminated structure having a lower specific gravity. As an illustration of this method, a foamable resin composition can be deposited upon a hot extruded sheet of thermoplastic resin and partially foamed by the sensible heat thereof. The resin foam then may be further expanded by passing the laminated structure through a hot-water bath, a steam chest, or a heating oven.

In the embodiment of the invention illustrated by Fig. 3, the thermoplastic resin sheet carrying the foamable resin composition is moved under a second substantially parallel surface which is moved in the same direction as the thermoplastic resin sheet, e.g., an endless belt. Side guides which project from the surface of the thermoplastic resin sheet to the second substantially parallel surface also are provided. The combination of the thermoplastic resin sheet, the second substantially parallel surface and the side guides define an elongated channel which is open only at the two ends and which functions as a die to define the profile of the laminated structure. When the foamable resin composition foams within this elongated channel, the pressure generated by the foaming or blowing agent may build up to a level materially above atmospheric pressure. The laminates prepared by this embodiment of the invention, in general, have superior physical properties and stronger adhesive bonds between the resin foam and the thermoplastic resin sheet.

The above descriptions and particularly the drawings and examples are set forth by way of illustration only. It will be obvious to those skilled in the art that many modifications and variations thereof can be made without departing from the spirit and scope of the invention therein described.

This application is a continuation-in-part of copending application Serial No. 545,346, filed November 7, 1955.

What is claimed is:

1. A continuous method for preparing laminated resin foam structures which comprises extruding a continuous sheet of thermoplastic resin and uniformly depositing a multitude of small particles of a foamable resin composition on the hot, moving thermoplastic sheet and employing the sensible heat of the extruded thermoplastic sheet to foam the resin particles; said foamable resin composition comprising discrete particles of a thermoplastic resin having incorporated therein a nonreactive organic liquid which volatilizes below the softening point of the thermoplastic resin and which has at most a slight solvent action on the thermoplastic resin.

2. The method of claim 1 in which the foamable resin composition is polystyrene having incorporated therein, as a foaming agent, a low boiling aliphatic hydrocarbon.

3. A continuous method for preparing laminated resin foam structures which comprises extruding a continuous sheet of thermoplastic resin, uniformly depositing a multitude of small particles of a foamable resin composition on the hot, moving thermoplastic resin sheet, employing the sensible heat of the extruded thermoplastic sheet to foam the resin particles and thereafter heating the foamed resin particles with heat from a second source to further expand the foamed resin and lower the density thereof; said foamable resin composition comprising discrete particles of a thermoplastic resin having incorporated therein a nonreactive organic liquid which volatilizes below the softening point of the thermoplastic resin and which has at most a slight solvent action on the thermoplastic resin.

4. A continuous method for preparing laminated resin foam structures which comprises extruding two continuous sheets of thermoplastic resin in closely spaced apart parallel relationship, uniformly depositing a multitude of small particles of a foamable resin composition within the cavity defined by the thermoplastic resin sheets and employing the sensible heat of the thermoplastic resin sheets to foam the resin particles; said foamable resin composition comprising discrete particles of a thermoplastic resin having incorporated therein a nonreactive organic liquid which volatilizes below the softening point of the thermoplastic resin and which has at most a slight solvent action on the thermoplastic resin.

5. The method of claim 4 in which the foamable resin composition is polystyrene having incorporated therein, as a foaming agent, a low boiling aliphatic hydrocarbon.

No references cited.